United States Patent
Kulas

(12) 
(10) Patent No.: US 6,809,704 B2
(45) Date of Patent: Oct. 26, 2004

(54) REDUCTION OF BLIND SPOTS BY USING DISPLAY SCREENS

(76) Inventor: Charles J. Kulas, 244 Texas St., San Francisco, CA (US) 94107

( * ) Notice: Subject to any disclaimer, the term of this patent is extended or adjusted under 35 U.S.C. 154(b) by 281 days.

(21) Appl. No.: 10/071,343

(22) Filed: Feb. 8, 2002

(65) Prior Publication Data

US 2003/0151563 A1 Aug. 14, 2003

(51) Int. Cl.$^7$ ............................................. G08G 1/017
(52) U.S. Cl. ........................................ 345/1.2; 340/937
(58) Field of Search ............................. 345/1.2, 7, 8, 9; 348/115, 128, 148, 330.01; 340/937, 958, 961, 980, 973, 975

(56) References Cited

U.S. PATENT DOCUMENTS

| | | | |
|---|---|---|---|
| 5,235,316 A | * 8/1993 | Qualizza | 340/436 |
| 5,414,439 A | * 5/1995 | Groves et al. | 345/7 |
| 6,243,482 B1 | * 6/2001 | Eibert et al. | 382/103 |
| 6,400,405 B2 | * 6/2002 | Tomida et al. | 348/333.05 |
| 6,405,975 B1 | * 6/2002 | Sankrithi et al. | 244/1 R |
| 6,424,272 B1 | * 7/2002 | Gutta et al. | 340/937 |
| 6,424,273 B1 | * 7/2002 | Gutta et al. | 340/937 |
| 6,549,139 B2 | * 4/2003 | Shaw, Jr. | 340/685 |

* cited by examiner

Primary Examiner—Vijay Shankar
Assistant Examiner—Nitin Patel
(74) Attorney, Agent, or Firm—Charles J. Kulas

(57) ABSTRACT

A system for reducing blind spots in various situations, such as in an automobile. The invention uses display screen surfaces to cover objects that are opaque, or objects which it is difficult to see through. Small cameras are used to generate images on the display screens that correspond to images that a viewer would see in the absence of the objects. For example, where the left windshield post of a car is covered with a display screen, the invention uses a camera that receives image information from the left-front of the car. The image information is used by a processor to compute what the driver would see if the door post were not there. A preferred embodiment uses the driver's viewpoint to generate a more accurate screen display. The screen display approximates images that the driver would see so that the images mesh, or are coherent with, other images presented to the driver such as the views through the front windshield and driver's side window. Another aspect of the invention provides movable mirrors to provide dual modes of viewing and to increase the mirror's field of view. Different modes, or mirror positions can be invoked manually or by automated detection of a viewer's head position or eye positions.

20 Claims, 3 Drawing Sheets

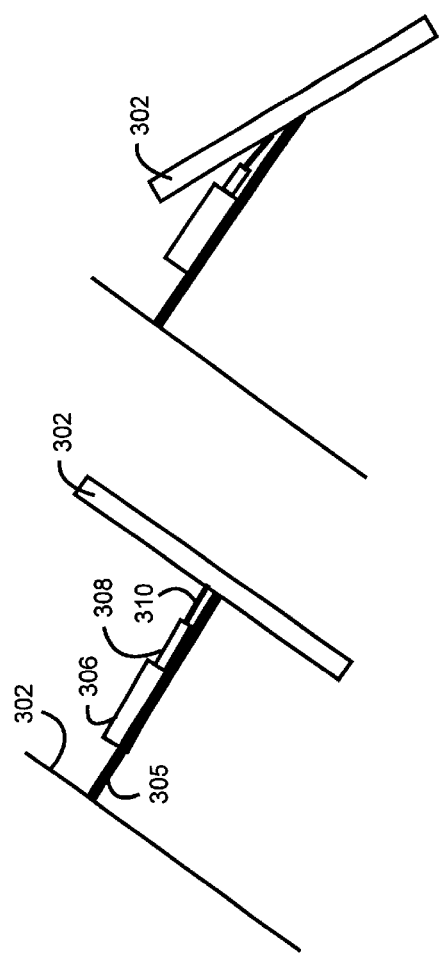
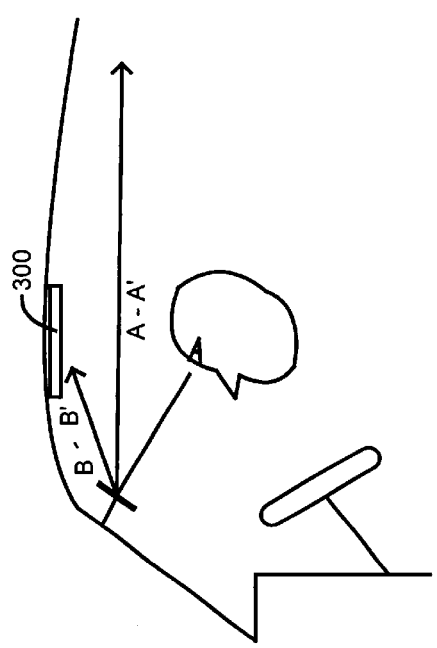
Fig. 4A
Fig. 4B
Fig. 4C

REDUCTION OF BLIND SPOTS BY USING DISPLAY SCREENS

BACKGROUND OF THE INVENTION

Blind spots are created by obstructions within a person's field of view. If it is not possible for the person to see substantially through the object a "blind spot" is created in the area obscured by the object. Blind spots are particularly problematic in hazardous areas as where a person is driving a car, operating machinery, or susceptible to injury. For example, the left and right windshield posts, roof, rear-view mirror, driver and passenger doors and hood of a car create unwanted blind spots. On the other hand, blindspots are commonplace because materials that are used for purposes such as structural strength, flexibility, electrical characteristics or other properties are often opaque.

SUMMARY OF THE INVENTION

The present invention reduces blind spots in various situations, such as in an automobile. The invention uses display screen surfaces to cover objects that are opaque, or objects which it is difficult to see through. Small cameras are used to generate images on the display screens that correspond to images that a viewer would see in the absence of the objects. For example, where the left windshield post of a car is covered with a display screen, the invention uses a camera that receives image information from the left-front of the car. The image information is used by a processor to compute what the driver would see if the door post were not there. A preferred embodiment uses the driver's viewpoint to generate a more accurate screen display. The screen display approximates images that the driver would see so that the images mesh, or are coherent with, other images presented to the driver such as the views through the front windshield and driver's side window.

Another aspect of the invention provides movable mirrors to provide dual modes of viewing and to increase the mirror's field of view. Different modes, or mirror positions can be invoked manually or by automated detection of a viewer's head position or eye positions.

In one embodiment the invention provides an apparatus for reducing blind spots, including a display screen covering at least part of an object's surface; a processor coupled to the display screen; at least one signal determining a human viewer's viewpoint; one or more instructions executable by the processor to generate image information for display on the display screen based on the viewer's viewpoint so that the viewer is presented with an approximation of a scene behind the object.

BRIEF DESCRIPTION OF THE DRAWINGS

FIG. 4A illustrates a dual mode rear-view mirror using mechanical positioning;

FIG. 4B shows a retractable rear-view mirror in an extended position; and

FIG. 4C shows a retractable rear-view mirror in a retracted position.

DETAILED DESCRIPTION OF A PREFERRED EMBODIMENT

Figure 1:
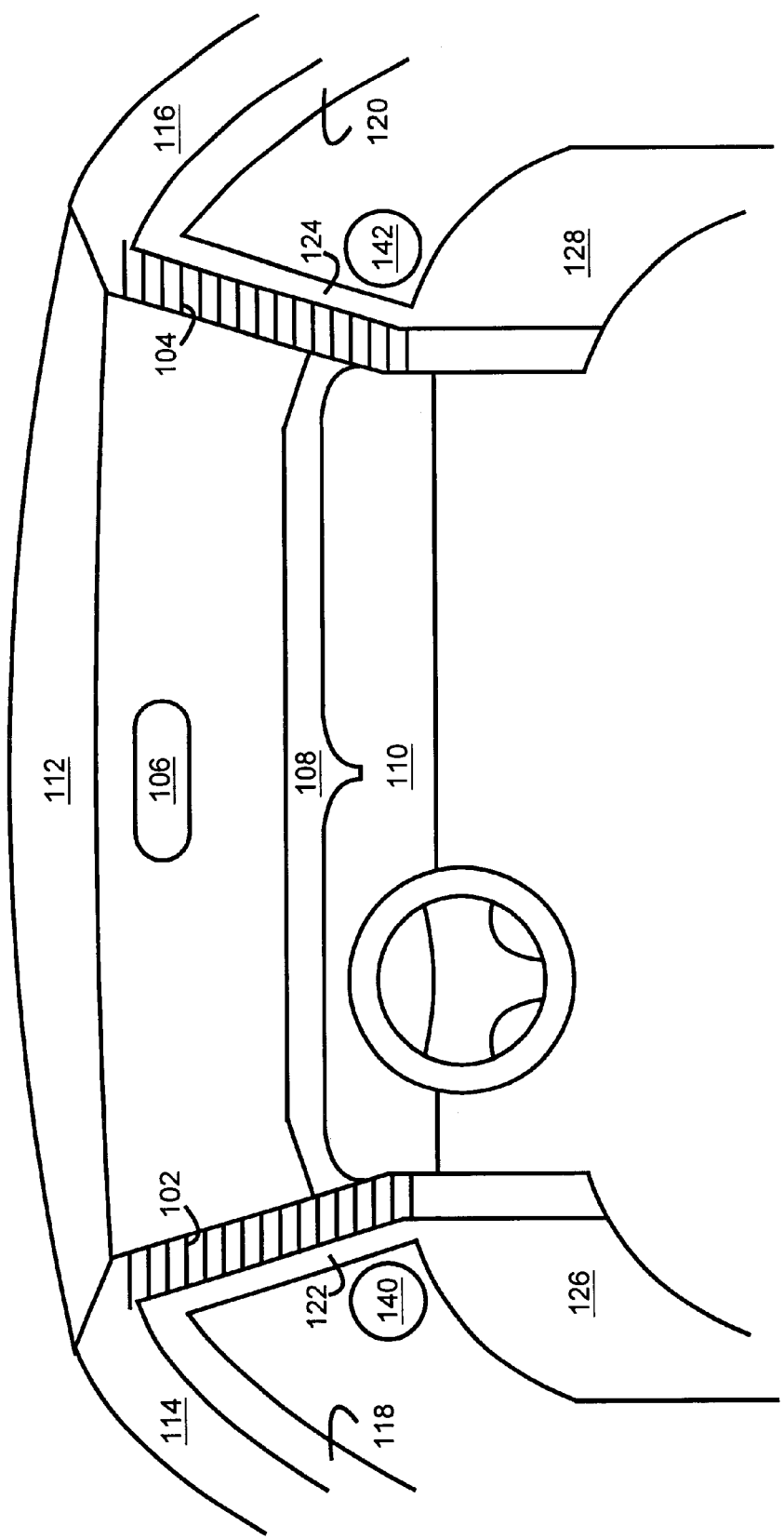
FIG. 1 illustrates a typical application of the invention in a vehicle.

FIG. 1 illustrates a typical application of the invention in a vehicle such as a car or truck.

In FIG. 1, a driver's viewpoint is illustrated showing various objects that obscure a driver's view. Of primary concern are left and right windshield posts 102 and 104, respectively. The windshield posts are sufficiently toward the front and are large enough that they can obscure outside images which, if seen, could reduce accidents or hazards. Rear-view mirror 106 also creates a blind spot for drivers that is directly in front of the vehicle direction and is a safety concern. Other obscuring objects include hood 108, dashboard 110, roof 112, left and right roof sides 114 and 116, respectively, left and right door tops 118 and 120, respectively; left and right door sides 122 and 124, respectively; left and right doors 126 and 128, respectively. Left and Right side view mirrors 140 and 142 are also shown.

A specific embodiment of the invention advantageously reduces blind spots due to the windshield posts. Naturally, additional, or other, objects can similarly be addressed. A second example deals with the rear-view mirror. Reduction of blind spots due to these forward-viewing obstructions reduces the large majority of important blind spots for a typical car driver.

In a preferred embodiment, the shaded surface of windshield post 102 is substantially covered by a display screen surface. Such a display screen can be a liquid-crystal display, thin-film transistor, plasma panel, electroluminescent or any type of display technology (e.g., fiber optic, optical, cathode ray tube, projection, holographic, etc). Preferably, the display screen surface matches the contours of the windshield post. A typical windshield post is somewhat tubular. However, the windshield post also has ridges, depressions, curvature and other characteristics and anomalies.

It is not necessary that all of the contour characteristics be exactly conformed by the display screen. For example, a smoothly curving tubular shape for the display screen is sufficient. The display screen is preferably a single construct although other embodiments can use multiple display screens. Not all of the obstructing area needs to be covered. The area can use different resolutions for different display screen areas. For example, it is more desirable to have a higher resolution in display screen areas that are directly facing the viewer's viewpoint (i.e., areas that appear flat to the viewer, or that are perpendicular to the viewer's line of sight) and to have decreasing resolution for areas that are at increasing angles to the viewpoint (e.g., areas that are curving away from the viewpoint, or are less perpendicular, as are those toward the edges of the post). Similarly, when computing the image information for a display screen, the contours of the display screen with respect to the viewpoint, line of sight, etc., are taken into account. For example, where the display screen is not perpendicular to the line of sight, foreshortening of images occurs. Foreshortening effects should be compensated so compensated images in the foreshortened areas produce a coherent image. Note that only the areas of an obstruction which are viewable by the viewer need to be covered.

Figure 2:
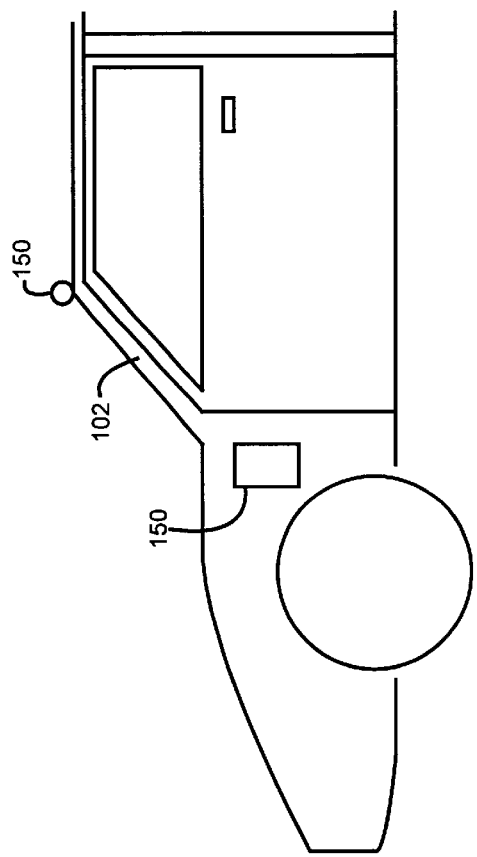
FIG. 2 shows components of a preferred embodiment of a system of the present invention.

FIG. 2 shows additional components of a preferred embodiment.

In FIG. 2, an outside view of the vehicle, or car, of FIG. 1 is shown. Left windshield post 120 is shown from the outside. Camera 150 is positioned on the outside of the car so that it can capture the scene that is obscured to a viewer by the windshield post. Processor 152 is located anywhere inside, or upon, the car and is coupled to both the display screen (not shown in FIG. 2 but shown as the shaded area on 102 of FIG. 1) and to camera 150. Image data from camera 150 are sent to processor 152. Processor 152 uses the image data along with an indication of the driver's (or "user's" or "viewer's") viewpoint and determination of the display screen to compute display information for display on the display screen. The position of the viewpoint, position and contour of the display screen and scene information are all relevant to computing the display information. Any manner, or process, including coded instructions or operations in software or hardware is suitable for computing the display information, as is known in the art.

Camera 150 can be located anywhere as long as it is able to acquire the field of view that is being obstructed. Other devices can be used for image data capture. The camera position and camera properties such as focal length, aperture, etc. can be used to create more accurate image data and display information. Techniques for image enhancement and correction, data compression, etc. can be used by processor 152 to improve the display presented to the driver.

A preferred embodiment generates images in real time with sufficient accuracy with respect to the driver's viewpoint so that the driver is presented with "coherent" image information, or a display on the display screen that is consistent with one or more aspects of other parts (not on the display screen) of the viewer's view. For example, where a portion of another car is obscured by the windshield post, the invention generates a display on the display screen so that the display includes the obscured portion of the other car presented in such a way so that the display screen image aligns with the actual outside scene, as viewed by the driver.

Figure 3:
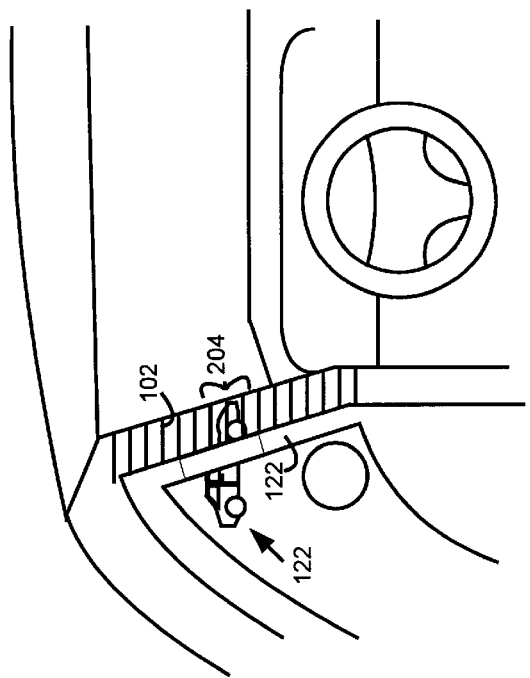
FIG. 3 illustrates coherent display.

FIG. 3 illustrates coherent display of other car 200 that is obscured by windshield post 102. In FIG. 3, displayed image portion 204 is displayed on display screen 220 that is mounted to windshield post 102. Note that displayed image portion 204 aligns with scene portion 202. Obscuring left side door frame 122 is not provided with a display screen and so the image is broken. However, the scene and displayed portions still line up and visually correspond. Thus, coherency is achieved and the driver is presented with visual cues as to what is behind the obscuring object—the windshield post. Obviously the door frame and other portions of the vehicle can be provided with display screens to further reduce blind spots and improve the scene coherency presented to the driver.

Driver viewpoint indication can be obtained in several ways. One approach is to use the seat position and known seat geometry. The seat position can be sensed so that, e.g., the backside seat angle, bottom seat height and forward-backward position, seat elevation, headrest position, etc. are automatically detected and used by the processor to obtain the driver's viewpoint. The position of the rear-view mirror and side view mirrors can be sensed and also used to interpolate the driver's viewpoint, with or without the seat position data.

Another way to obtain the driver's viewpoint is to have the driver manually indicate the viewpoint to the processor. For example, a touchpad can be used to obtain the driver's height, or seated height. Another approach is to use feedback where a mark is displayed on a display screen (e.g., the display screen on the windshield post) and is moved until the user indicates that the mark is at viewpoint height. The user can use an emitting probe and position sensors can be used to detect the probe position when the user indicates that the position is coincident with the user's eyes. For example, an infrared, radio-frequency, acoustic, or other emitter or reflector can be used as the probe and sensor information from one or more sensors can detect the emitted or reflected signals. Triangulation can be used with two or more sensors to more accurately determine the viewpoint position.

Although the preferred embodiment uses a digital processor to compute display screen views, any manner of display information generation can be used. Multiple processors, hybrid processing, optical, biometric, or other forms of information generation can be employed.

Any type of data transfer system, such as a hardwired or wireless network, can be used to provide communication between the processor, sensors, display screens, or other mechanisms and components of the invention.

The rear-view mirror (106 of FIG. 1) is especially problematic as a driver forward-view blind spot since it occupies an important and large portion of the driver's view, yet is necessary to allow the driver to see behind the car. One embodiment allows the rear-view mirror to have a dual viewing mode. In one mode the driver is presented with a rear-view and in another mode the driver is presented with a forward view.

The rear-view mirror can include a display screen in place of the mirror surface, as described above. Front and back-facing cameras allow a driver to select either a forward view or a rear view for the display screen on the rear-view mirror. Such selection can be by depressing a button (e.g., on the steering wheel) or other switch or control. Alternatively, the driver's line-of-sight can be tracked according to the discussion, above. When the driver is looking at a predetermined portion of the rear-view mirror, the display is switched to the rear view. A preferred embodiment uses head position to determine the mode. Thus, a driver is presented with the rear-view when the driver's head is in the forward position. In this manner the driver can see the rear-view through the rear-view mirror by moving only his or her eyes. When the driver's head is moved slightly to view face the rear-view mirror, the forward view is presented. Head position sensing devices such as the TrackIR by™ by NaturalPoint™, or other systems, can be used.

Various approaches, some of which are discussed, below, are possible for enabling a rear-view mirror (or side view mirrors, or other surfaces) to show different modes.

FIG. 4 illustrates a dual mode rear-view mirror using mechanical positioning.

In FIG. 4, rear-view mirror 300 is fitted with a solenoid, or other mechanical positioning device to accurately and selectively position the mirror in at least two positions, or angles. At a first angle, a driver's line-of-sight is reflected along A–A' so that the driver sees through the rear of the vehicle as normal. At a second angle the mirror is adjusted so that the driver's line of sight is now along B–B' so that the driver now sees display screen 300 reflected in the rear-view mirror. Such deflection angle can be controlled by a processor, such as processor 152 of FIG. 2, or by another mechanism. In this manner, the system can automatically or manually (i.e., by driver selection) switch between rear-view mirror views.

Naturally, display screen 300 is provided with display information such that the images seen by the driver in the rear-view mirror (while in the forward view mode) are coherent with the outside scene as viewed through the windshield. To improve the mapping of the display screen to the outside scene the display screen can be oriented more normally (i.e., at a right angle) to B–B'. Preferably such orientation should not impede the driver's backward looking A–A' view.

Note that automated mirror positioning can be used to reduce blind spots due to mirror field of view. By moving a mirror in small angles an increased field of view is created. Thus, moving rear-view mirror 300 in other directions (e.g., side-to-side, circular, sweeping, or other angles or patterns) it is possible to present a wider area in the mirror's reflection. Mirror sweeping can be on-demand by driver manual selection, by head or eye positioning, at timed intervals, or according to other designs.

Changing a mirror's view can be done with multiple mirrors, micromirrors, or other approaches rather than a mechanical positioning of a single mirror, as described above. An alternative to repositioning a reflection in the dual mode application is to use a display screen that provides a "see through" mode to an underlying reflective surface. In such an approach, the mirror operates in a first mode as a backward viewing mirror (as in the prior art) by allowing the display screen to be transparent to visible light, or by having opaque portions of the display screen move out of the line of sight (either by mechanical, macro, micro or other means). Such a device may be achieved by TFT displays, or by the use of combined display technology and micromirrors.

FIGS. 4B and 4C illustrate a retractable mirror.

In FIG. 4B, mirror 302 is connected to windshield 304 by attaching member 305. Mirror 302 is rotatably attached to attaching member 305 and to connector 310. Connector 310 is attached to plunger 308 which is slidably coupled to solenoid body 306. Solenoid body 306 is mounted to attaching member 305.

Upon receiving an energizing signal (manually or automatically, as discussed herein) the solenoid arrangement of components 306, 308 and 310 causes connector 310 to move away from mirror 302 and toward windshield 304. This causes mirror 302 to move into a retracted position, shown in FIG. 4C, whereby a driver's forward field of view is less obstructed by mirror 302 since the mirror is now being viewed edge-on. The solenoid can be later instructed to move the mirror back to the position of FIG. 4B so that backward viewing is effected. In this manner, an improved rear-view mirror is provided so that a driver can be presented with a less obstructed forward view while also having a backward view.

Note that multiple mirror sections can be used to comprise a single rear-view mirror. In this approach, the mirror sections can be moved as described for the single-section mirror (FIGS. 4B and 4C) so that the sections move together to create a louvred or "window blind" effect. Many such mirror sections can be used on a small scale so that switching can be instantaneous and use low power. For example, micromirrors may be employed.

A refinement to the invention allows "distant" focus for the displayed images so the driver does not have to refocus in looking between the external scene and images on a display surface. For example, the display can be similar to a "heads-up-display" (HUD) where the user is provided with images that are in focus when the eyes are focused at a point at infinity. In general, it is desirable to generate display screen information to approximate the same distance as the outside scene so that a only a single eye focus is needed to view both the display and an outside object of interest.

Although the present invention has been discussed with respect to specific embodiments thereof, these embodiments are illustrative, and not restrictive of the invention. For example, any type of object or obstruction that creates a blind spot can be the subject of the present invention. The object need not be fixed and can be rigid, flexible or have a changing shape. Although the invention has been described primarily with respect to an automobile or similar vehicle, any type of vehicle, enclosure, or even standalone, singular obstructions can be suitably addressed. For example, lampposts, telephone poles, doorways, toasters, even living organisms such as people, can be obstructing objects and can be susceptible to aspects of the present invention. Each such object can be provided with a display screen and image information for display can be computed and transferred for display on the display screen to provide a viewer with a coherent view that reduces the blind spots.

Although the invention has been discussed primarily with respect to a forward field of view, display screens can be provided in areas that are not immediately visible to a viewer, such as a driver of a car. For example, when a driver looks over her shoulder the backward-looking view is now the primary view and includes obstructions such as the rear window posts, rear doors or car sides, car seats, trunk, etc. Display screens can be fitted to any or all of these obstructing items. The image information for these screens can be activated when the driver puts the car into reverse, or when the driver's view is sensed as being backward-looking.

Although emphasis has been on recreating the blocked or obstructed scene as accurately as possible, other embodiments can provide an enhanced image. For example, night vision cameras or sensors can show objects that might not be visible even if an obstruction were not present due to low light. Similarly, radar, sonar or other approaches can provide enhanced visual information when conditions (e.g., fog, dust, weather, etc.) are present.

Thus, the scope of the invention is to be determined solely by the appended claims.

What is claimed is:

1. An apparatus for improving driver visibility in an automobile, wherein the automobile includes a windshield post, the apparatus comprising a display screen for mounting onto the windshield post to cover at least a portion of the windshield post;

a processor coupled to the display screen;

a camera;

a computer-readable medium that includes one or more instructions for a display process that receives image information from the camera and generates display information for the display screen so that a first portion of an object blocked from a driver's view by the windshield post is displayed on the display screen in substantial alignment with a second portion of the object that is not blocked from the driver's view by the windshield post.

2. The apparatus of claim 1, further comprising an input process for receiving an indication of the driver's viewpoint; and wherein the display process uses the driver's viewpoint to generate the display information.

3. The apparatus of claim 1, further comprising a detector for automatically detecting a driver's viewpoint.

4. A method for reducing blind spots, comprising covering at least part of an obstruction's surface with a display screen;

determining a human viewer's viewpoint;

using a processor to generate image information for display on the display screen based on the viewer's viewpoint so that a first part of an object blocked from the viewer's view by the obstruction is displayed on the display screen in substantial alignment with a second part of the object that is not blocked from the viewer's view by the obstruction.

5. The method of claim 4, further comprising
using a camera to obtain image data to derive the image information.

6. The method of claim 4, wherein the step of determining a human viewer's viewpoint includes
detecting a position of a portion of a seat in which the human viewer is sitting.

7. The method of claim 4, wherein the step of determining a human viewer's viewpoint includes
detecting one or more mirror positions.

8. The method of claim 4, wherein the step of determining a human user's viewpoint includes
accepting a signal from a user input device.

9. An apparatus for reducing blind spots, the apparatus comprising
a display screen covering at least part of an object's surface;
a processor coupled to the display screen;
at least one signal determining a human viewer's viewpoint; and p1 a machine-readable medium including one or more instructions executable by the processor to generate image information for display on the display screen based so that a first portion of an object blocked from the viewer's view is displayed on the display screen in substantial alignment with a second portion of the object that is not blocked from the viewer's view.

10. The apparatus of claim 9, further comprising
a camera coupled to the processor, wherein the camera provides image data to derive the image information.

11. The apparatus of claim 9, wherein the at least one signal determining a human viewer's viewpoint is generated at least in part by detection of a position of a driver's seat.

12. The apparatus of claim 9, wherein the at least one signal determining a human viewer's viewpoint is generated at least in part by detection of one or more mirror positions.

13. The apparatus of claim 9, wherein the at least one signal determining a human viewer's viewpoint is generated at least in part by acceptance of signals from a user input device.

14. The apparatus of claim 9, wherein the at least one signal determining a human viewer's viewpoint is generated at least in part by a position sensor.

15. An apparatus for reflective viewing, the apparatus comprising
a reflective surface;
a processor;
a surface movement mechanism coupled to the reflective surface to move the reflective surface in response to a signal; and
a machine readable medium including one or more instructions executed by the processor for generating the signal to move the mirror to allow viewing of an object behind the reflective surface.

16. The apparatus of claim 15, further comprising
a machine readable medium including one or more instructions executed by the processor to move the mirror in response to a signal from a user input device.

17. The apparatus of claim 15, further comprising
a sensor for determining a user's viewing direction; and
a machine readable medium including one or more instructions executed by the processor to move the mirror in response to a signal from the sensor.

18. The apparatus of claim 15, further comprising
a micromirror device.

19. An apparatus for reflective viewing, the apparatus comprising
a reflective surface;
a processor;
a surface movement mechanism coupled to the reflective surface to move the reflective surface in response to a signal; and
one or more instructions executed by the processor for generating the signal to move the mirror; and
a display screen having an image portion which is reflected by the mirror and visible to a human user when the mirror is in a first position, wherein the display screen image portion is not visible when then mirror is in a second position.

20. The apparatus of claim 15, further comprising
a display screen between the reflective surface and a human user, wherein the display screen is viewable by the human user in a first mode.

* * * * *